US008870196B1

(12) United States Patent
Christie et al.

(10) Patent No.: US 8,870,196 B1
(45) Date of Patent: Oct. 28, 2014

(54) TROLLEY

(71) Applicants: Christie Lites Enterprises Canada Inc., Toronto (CA); Adler Metal Works Limited, Consecon (CA)

(72) Inventors: Huntly Gordon Christie, Windermere, FL (US); Percy Adler, Consecon (CA)

(73) Assignees: Adler Metal Works Limited, Consecon, ON; Christie Lites Enterprises Canada Inc., Toronto, ON ( * ) Notice: Subject to any disclaimer, the term of this patent is extended or adjusted under 35 U.S.C. 154(b) by 0 days.

(21) Appl. No.: 13/938,959

(22) Filed: Jul. 10, 2013

(51) Int. Cl.
 *B62B 3/04* (2006.01)
 *B62B 3/00* (2006.01)

(52) U.S. Cl.
 CPC ..................................... *B62B 3/002* (2013.01)
 USPC ....................................... 280/79.3; 280/47.35

(58) Field of Classification Search
 CPC ........ B62B 3/002; B62B 3/004; B62B 3/005; B62B 3/009; B62B 3/04; B62B 3/10
 USPC .............. 280/47.34, 47.35, 79.11, 79.3, 79.6, 280/79.7; 211/4, 7, 123, 124, 162
 See application file for complete search history.

(56) References Cited

U.S. PATENT DOCUMENTS

| | | | |
|---|---|---|---|
| 5,076,651 A * | 12/1991 | White | 312/265.3 |
| 5,924,577 A * | 7/1999 | Gessert | 211/41.1 |
| 8,517,397 B2 * | 8/2013 | Gross | 280/35 |

* cited by examiner

*Primary Examiner* — John Walters
(74) *Attorney, Agent, or Firm* — Dimock Stratton LLP

(57) ABSTRACT

A trolley is provided for storing and transporting components. The trolley has a frame and a cover that can open or close. The frame has a base, rollers mounted on the bottom of the base, vertical supports extending from the top of the base, and one or more pairs of rails mounted in between adjacent vertical supports, each pair of rails being adapted to receive and support said components. The cover has a first side support that is hingeably mounted to the frame, a second side support, and cross members substantially parallel to one another and horizontally spaced apart, mounted between the first side support and the second side support. When the cover is open, components may be loaded by sliding them along a pair of rails or by lowering the components between a pair of rails. When the cover closed, loaded components are constrained from movement.

11 Claims, 6 Drawing Sheets

TROLLEY

TECHNICAL FIELD

The present disclosure generally relates to trolleys.

TECHNICAL BACKGROUND

Trolleys may be used in a variety of industries, including the entertainment industry, where they are used for storing and transporting components in truss assemblies. Examples of such components include: truss sections, lighting, cameras, and speaker systems.

Components (such as truss sections, lighting, camera, or sound equipment) may be transported by storing them in boxes or cases. It is typically extremely costly to store and transport the truss sections and components due to the weight of the equipment, and the volume of space required. It is also typically time consuming and costly to load and unload components because of their weight and size.

BRIEF DESCRIPTION OF THE DRAWINGS

In drawings which illustrate by way of example only a preferred embodiment.

DETAILED DESCRIPTION

Figure 1:
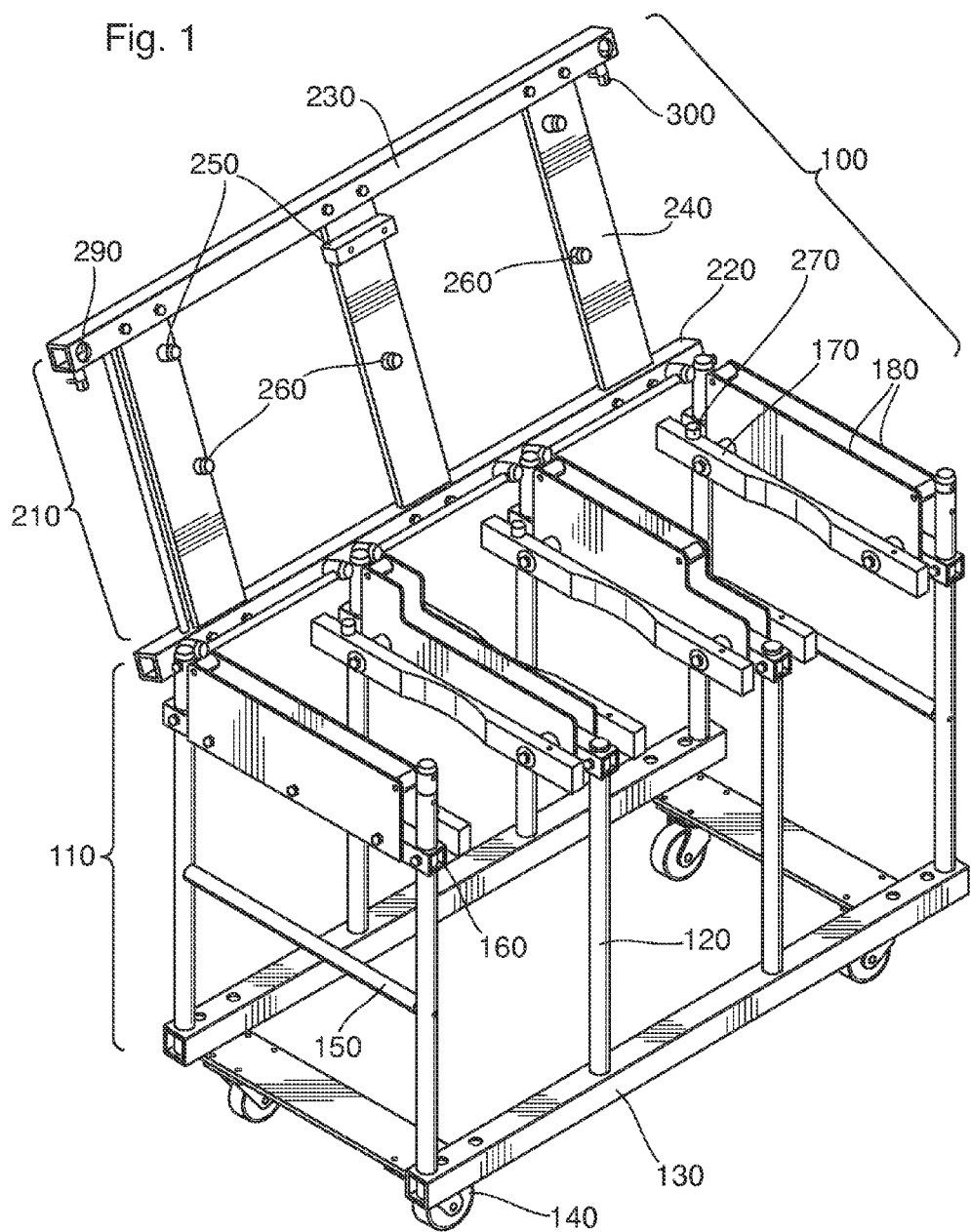
FIG. 1 is a perspective view of an embodiment of a trolley where the cover is in an open position.

There is therefore provided a trolley for transporting components for assembly into a truss, including truss sections, lighting components, camera components, or sound components. The embodiments described permit loading of components from above the trolley and from the side of the trolley.

In one aspect, the trolley comprises: a frame comprising a base having a top and a bottom and a plurality of rollers mounted on the bottom of the base, a plurality of vertical supports extending from the top of the base, and one or more pairs of rails mounted in between adjacent vertical supports, the one or more pairs of rails being mounted proximate a top end of the vertical supports, whereby each of the pairs of rails are adapted to receive and support one of the one or more components; and a cover having an open position and a closed position, comprising a first and second side supports, the first side support being hingeably mounted to a top of the frame, a plurality of cross members substantially parallel to one another and horizontally spaced apart, mounted between the first side support and the second side support. When the cover is in the open position, the one or more components may be loaded by sliding one of the one or more components along one of the one or more pairs of rails or by lowering the one or more components between one of the one or more pairs of rails. When the cover is in the closed position, the one or more components are constrained from movement.

In another aspect, the trolley frame further comprises a pair of slotted cross pieces horizontally spaced apart, perpendicular to the first and second side supports of the cover, and positioned proximate opposite ends of the trolley, whereby the slots of the pair of cross pieces are adapted to receive a plurality of rollers, and whereby when a first trolley is stacked on a second trolley, the pair of slotted cross pieces of the second truss and trolley assembly receives the rollers of the first trolley, preventing the rollers from any rolling or swiveling movement.

In yet another aspect, each rail of the one or more pairs of rails comprise a rail stopper, whereby when one of said one or more components are loaded onto the trolley by sliding the component along one of said one or more pairs of rails, the component is prevented by the rail stopper from further advancement along the pair of rails.

In a further aspect, vertical movement of the one or more components is constrained by providing a plurality of first cover bushings.

In still a further aspect, horizontal movement of the one or more components is constrained by providing a plurality of second cover bushings.

In another aspect, at least one of the plurality of second cover bushings is a rectangular prism.

In yet another aspect, at least one of the plurality of second cover bushings is cylindrical.

In a further aspect, the trolley is further provided with a lock assembly for releasably securing the cover to the frame.

In still a further aspect, the lock assembly comprises one or more pins mounted to the cover, wherein each of the one or more pins have a corresponding aperture on the frame for receiving the one or more pins.

In another aspect, the trolley further comprises a plurality of horizontal supports mounted in between adjacent vertical supports, the horizontal supports being vertically spaced from the base of the trolley.

In yet another aspect, two of the vertical supports of the frame each comprise a coupler, and a bottom of the second side support comprises couplers for detachably receiving the pair of couplers of the vertical supports of the frame.

FIG. 1 is a perspective view of an embodiment of a trolley 100. In this figure, trolley 100 comprises a base assembly 130, a plurality of vertical supports 120, and a plurality of rollers 140. The plurality of vertical supports 120 are attached on the bottom end to the top side of the base assembly 130. Trolley 100 may further comprise a pair of cross-members 150 mounted on opposite sides of trolley 100. Cross-members 150 are attached to adjacent vertical supports 120 to provide a means for lifting the trolley 100 and for providing lateral support to vertical supports 120. The plurality of rollers 140 are attached to the underside of the base assembly 130. The rollers 140 are preferably swivebly mounted, such that rollers 140 may swivel about a vertical axis.

In the embodiment in FIG. 1, a plurality of rail supports 160 are provided. The rail supports 160 are attached to adjacent vertical supports 120 to provide means for attaching rails 170 and for attaching a pair of slot walls 180. Rail supports 160 are perpendicular to vertical supports 120 and are proximate a top end of the vertical supports 120.

The space or slot portion 190 between each of the pairs of slot walls 180 may be used for additional storage space in the trolley for storing component accessories such as cables and the like. Slot walls 180 may be of different shapes and sizes to accommodate differences in component 200 dimensions. In the embodiment shown in FIG. 1, the slot walls 180 towards the middle of the trolley 100 are of different dimensions than the slot walls 180 on the ends of the trolley 100. In this embodiment, the top edges of the slot walls 180 in the middle of the trolley 100 do not extend in a straight line and instead have higher portions and lower portions. The lower portions are provided to permit loading of components which have portions extending outside of the general footprint of the component. In some embodiments, components 200 may have cables which remain attached during transport and protrude from the side of the component. Slot walls 180 may also constrain the side to side movement of the component.

Rails 170 are provided in pairs for supporting a component 200. In the embodiment shown in FIG. 4, components 200 preferably comprise abutment portions which are adapted to rest on rails 170. In this way, components 200 may be loaded from the side of the trolley 100 by resting the abutting portion of the components 200 on the rails 170 and sliding the components 200 into the trolley 100 using the rails 170 as a guide. Rail stoppers 270 are provided proximate a far end of each rail 170 to prevent components 200 from advancement beyond the rail stopper 270. Rail stoppers 270 are preferably adapted such that when loaded, components 200 are centered on the trolley 100. The position of rail stoppers 270 may be adjustable to allow proper positioning of components 200 of different sizes and dimensions.

A pair of horizontal supports 150 is provided on opposite sides of trolley 100. The horizontal supports 150 are mounted to adjacent vertical supports 120 to provide a means for lifting the trolley 100 and for providing lateral support to vertical supports 120.

In the embodiment illustrated in FIG. 1, trolley 100 comprises a cover 210 shown in an open position. Components 200 may be loaded onto the trolley 100 when the cover 210 is in an open position. In addition to permitting side-loading of components 200, trolley 100 permits loading of components 200 from above, either manually or with machinery, by lowering components 200 in between one of the pairs of rails 170 provided.

Cover 210 comprises a first side member 220 which is hingeably mounted to the plurality of vertical supports 120 on one side of the trolley 100 such that cover 210 may be opened and closed about an axis defined by the first side member 220. In this embodiment, cover 210 further comprises three cross members 240 and a second side member 230. Each of the three cross members 240 are provided with first cover bushings 250 and second cover bushings 260. First cover bushings 250 are provided on each of the cross members 240 proximate the second side member 230. Second cover bushings 260 are provided proximate a midpoint of each of the cross members 240.

Figure 4:
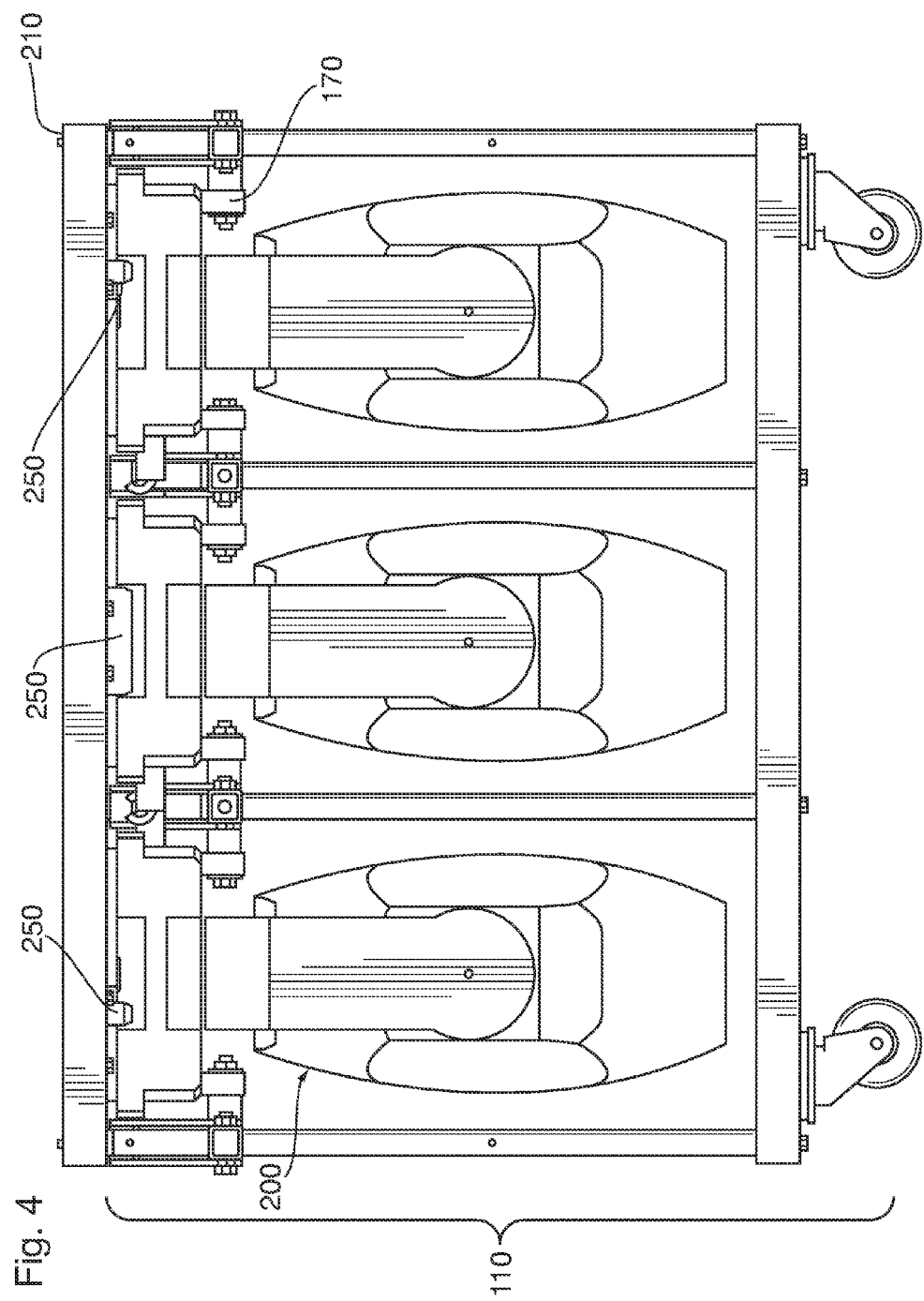
FIG. 4 is a side view of the trolley of FIG. 3.
Figure 5:
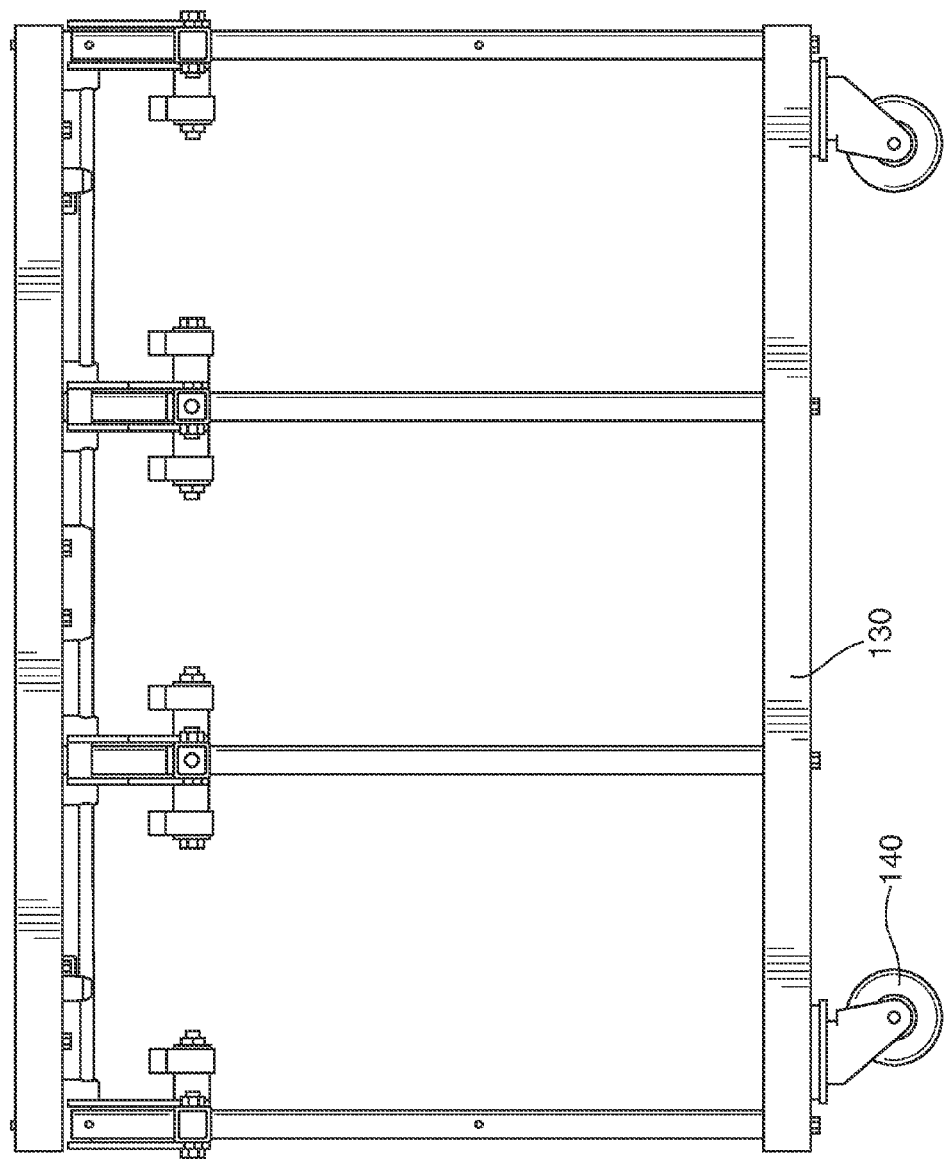
FIG. 5 is a side view of the trolley of FIG. 2.

As can be seen from FIGS. 1 and 4, the first cover bushings 250 may be provided in different shapes and sizes. First cover bushing 250 on the middle cross member 240 is a rectangular bar, whereas first cover bushings 250 on cross members 240 on either side of the middle cross member are cylindrically shaped. In this embodiment, a rectangular bar is provided for the middle component 200 because it constrains side-to-side lateral movement. This is not needed for the components 200 on the ends of the trolley 100. For the end components, movement is constrained on one side by the slot walls 180 and on the other side by a cylindrically shaped first cover bushing 250. It will be apparent that rectangular first cover bushings 250 may be provided on each of the three cross members 240. Moreover, if each of the slot walls 180 is adapted to constrain lateral side-to-side movement, a rectangular first cover bushing 250 may not be required for constraining lateral side-to-side movement.

Figure 2:
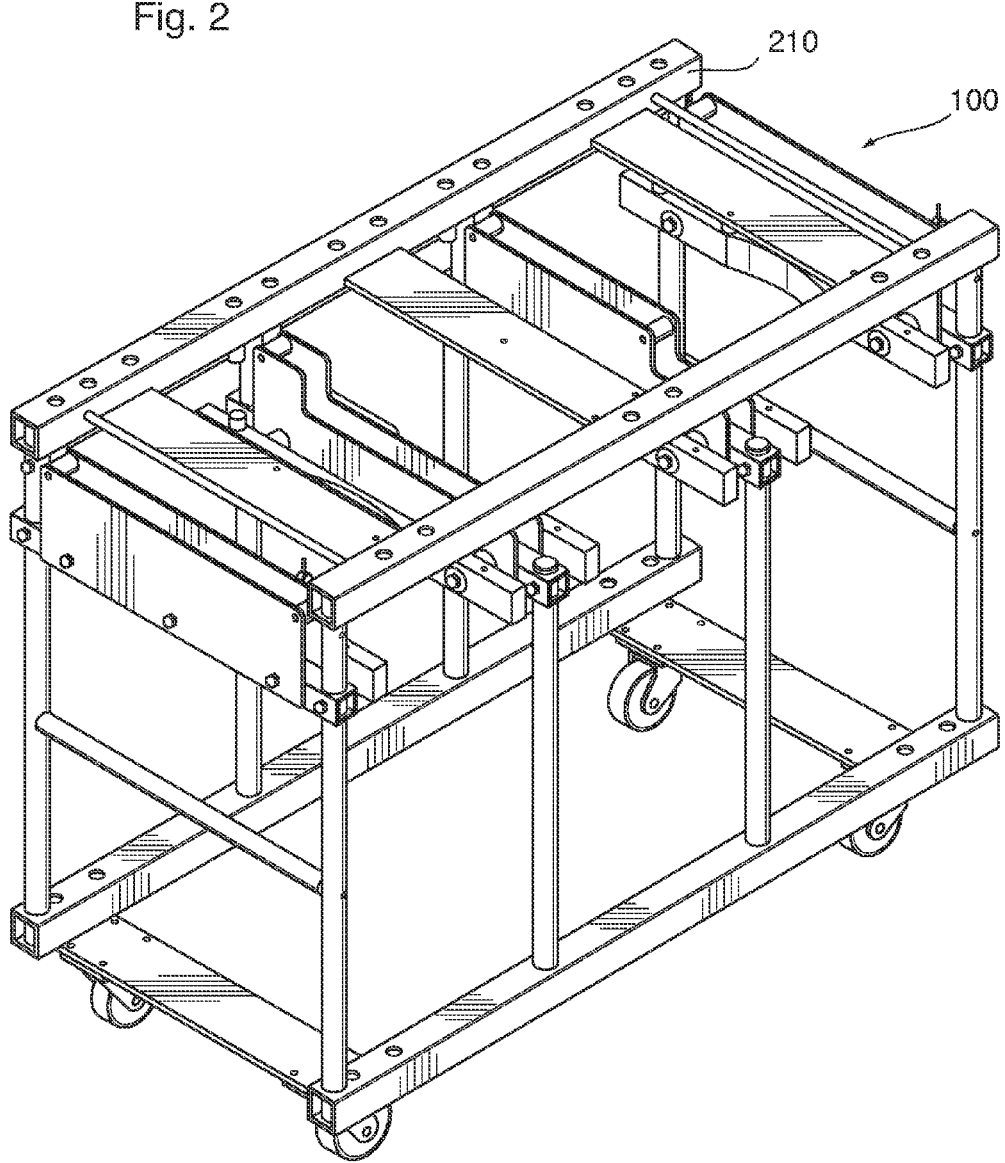
FIG. 2 is a perspective view of the trolley of FIG. 1 where the cover is in a closed position.
Figure 3:
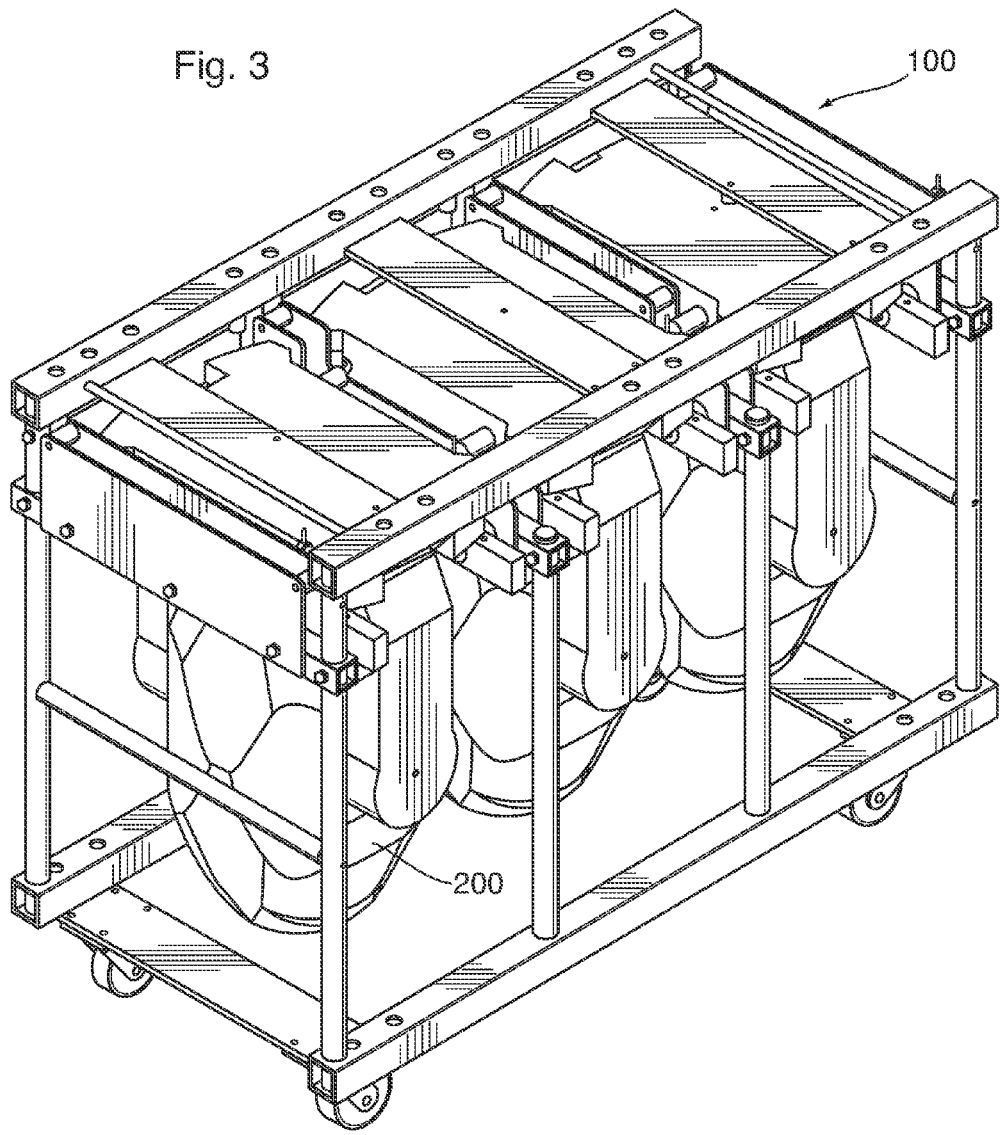
FIG. 3 is a perspective view of the trolley of FIG. 2 where a plurality of components is loaded in the trolley.

FIGS. 2-4 illustrate trolley 100 when the cover 210 is in a closed position. FIG. 2 illustrates trolley 100 with no components 200 loaded. FIGS. 3 and 4 illustrate trolley 100 with three components 200 loaded. First cover bushings 250 are adapted to prevent lateral movement of the components 200 when the cover 210 is in a closed position, and in particular, to prevent loaded components 200 from sliding off of the rails 170. This is particularly advantageous when the trolley 100 is being transported from one location to another. As can be seen in FIG. 4, first cover bushings 250 are adapted to contact one or more vertical surfaces of component 200 to prevent lateral movement. The position, size, and shape of first cover bushings 250 may be adjustable to allow proper positioning of components 200 and to accommodate different sizes and dimensions of said components.

The second cover bushings 260 provided on each of cross members 240 are provided for constraining vertical movement when the cover 210 is in a closed position as illustrated in FIGS. 2-4. Second cover bushings 260 are adapted to contact a horizontal surface. The position, size, and shape of second cover bushings 260 may be adjustable to accommodate different sizes and dimensions of the components 200.

Turning again to FIG. 1, cover 210 is provided with apertures 290. Each aperture 290 is adapted to receive a top portion of a corresponding vertical support 120 positioned at the corners of trolley 100. When cover 210 is in a closed position, cover 210 may provide additional stability and support to frame 110. This is particularly advantageous as trolley 100 may be subject to shearing and crushing forces while in transport.

Each trolley 100 may be adapted to stack on top of another trolley 100. In the example shown in FIG. 1, the slot portion 190 between pairs of slot walls 180 that are on the ends of the trolley 100 may be adapted to receive rollers of a trolley 100 which has been stacked thereon. When a first trolley 100 is stacked on top of a second trolley 100, the rollers 140 of the first trolley 100 slot into the slot portion of the second trolley 100. In this way, the rollers 140 of the first trolley 100 are prevented from rotating or swiveling, thereby preventing the first trolley 100 from shifting when it is stacked onto the second trolley 100.

Those skilled in the art will appreciate that a variety of components may be loaded on the trolley 100, including, for example cameras, light fixtures, and speakers, among other things. An example of this is illustrated in FIGS. 3 and 4.

Trolley 100 may further comprise a means for securing the cover 210 to the frame 110. For example, cover 210 may further comprise a means for securing the cover 210. In this way, the cover 210 is prevented from disengaging from the frame 110 during transport, thereby also keeping the components 200 in place on the trolley 100. In the embodiment shown in FIG. 1, the cover 210 comprises a pin 300 for releasably securing cover 210 to the frame 110. A corresponding aperture (not shown) may be provided for receiving the pin 300. In this embodiment, the apertures may be provided on vertical supports 120. Pin 300 may be a spring-loaded pin which biases to a "locked" position. The pin 300 may be manipulated to an "unlocked" position, at which point the cover 210 may be lowered onto the frame 110. Once the pins 300 are aligned with their corresponding apertures, the user allows the pins 300 to return to a "locked" position to secure the cover 210 to the frame 110.

The examples in the figures illustrate trolleys 100 which are dimensioned to accommodate the loading of three components by providing three pairs of rails 170. However, it will be appreciated that the number of pairs of rails provided in a trolley 100 may be varied to accommodate more or less than three components 200. It will also be appreciated that the positioning of the rails 170 may also be varied to accommodate components 200 of different sizes and dimensions.

FIGS. 3 and 4 illustrate a plurality of components 200 loaded in a trolley 100. The components generally reside within the footprint created by the frame 110, and are generally surrounded by the frame below, the vertical supports 120 around the sides, and the cover 210. By providing a frame 110 and cover 210 on the trolley 100 which surrounds the lighting components, the lighting components are protected from being damaged while in transport. In another example, a plurality of trolleys 100 may be wheeled in a stacked configuration, so that a plurality of trolleys may be wheeled together.

Figure 6:
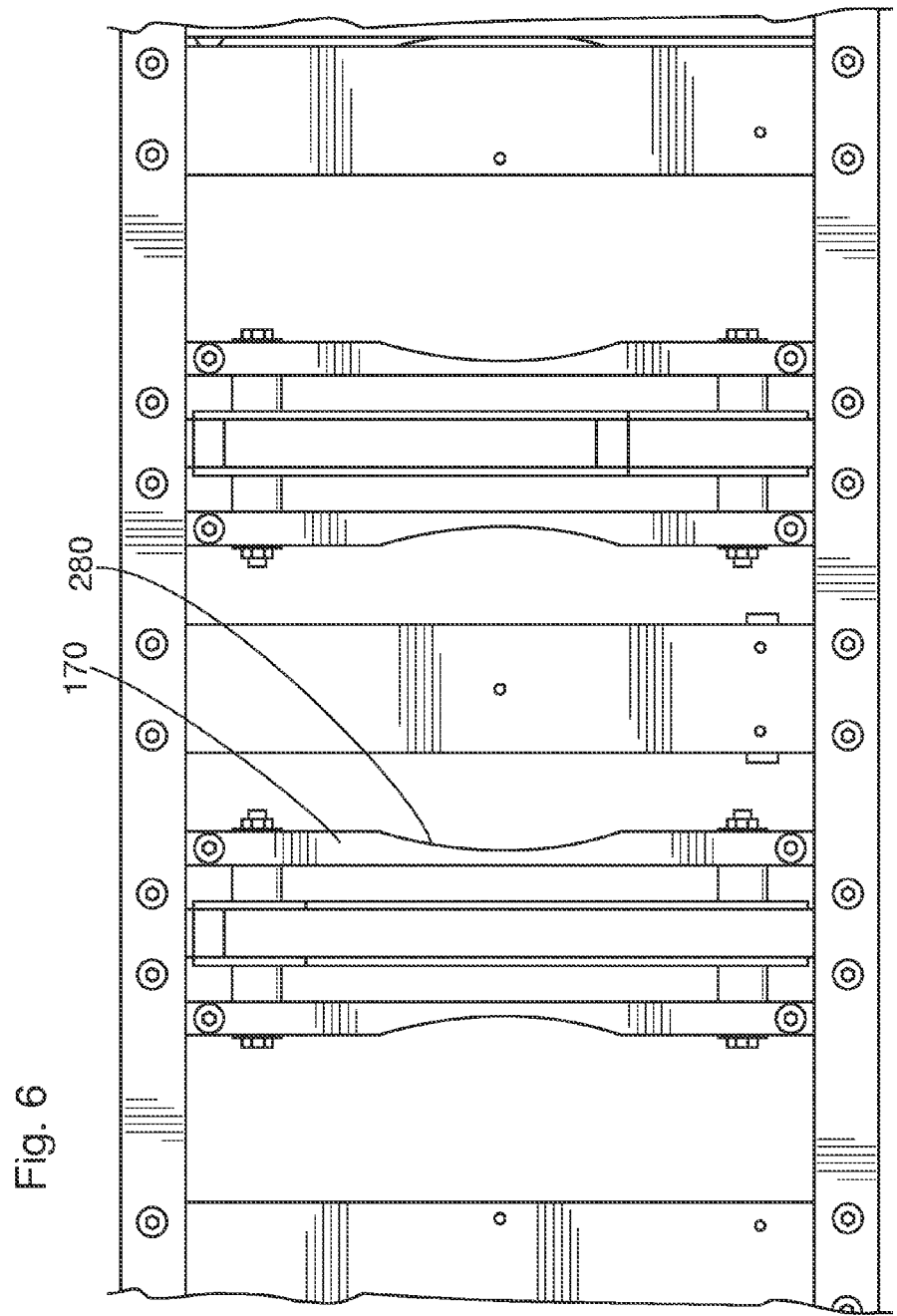
FIG. 6 is a top view of the trolley of FIG. 2.

FIG. 6 illustrates a top view of the trolley 100 of FIG. 2, wherein the cover 210 is in a closed position. As shown in FIG. 6, rails 170 comprise an arcuate portion 280 proximate a midpoint of each of rails 170. The arcuate portion 280 is provided to accommodate components 200 which have a substantially circular or oval footprint. The additional space allows components 200 which have a circular or oval footprint to be lowered into the trolley 100 without being blocked by rails 170. It will be appreciated that the footprint of the lower portions of the component 200 must fit between rails 170 for the component 200 to be loaded from above the trolley 100. Accordingly, rails 170 may be provided in different dimensions to accommodate components 200 of different shapes and sizes.

Various embodiments having been thus described in detail by way of example, it will be apparent to those skilled in the art that variations and modifications may be made and still achieve the desired outcome. The embodiments described herein include all such variations and modifications as fall within the scope of the appended claims.

The invention claimed is:

1. A trolley for storing and transporting one or more components, comprising:
   a frame, comprising:
      a base having a top and a bottom and a plurality of rollers mounted on the bottom of the base;
      a plurality of vertical supports extending from the top of the base;
      one or more pairs of rails mounted in between adjacent vertical supports, said one or more pairs of rails being mounted proximate a top end of the vertical supports, whereby each of said pairs of rails are adapted to receive and support one of said one or more components;
   a cover having an open position and a closed position, comprising:
      a first and second side supports, said first side support being hingeably mounted to a top of the frame;
      a plurality of cross members substantially parallel to one another and horizontally spaced apart, mounted between said first side support and said second side support;
   whereby when said cover is in said open position, said one or more components may be loaded by sliding one of said one or more components along one of said one or more pairs of rails or by lowering said one or more components between one of said one or more pairs of rails;
   whereby when said cover is in said closed position, said one or more components are constrained from movement.

2. The trolley of claim 1, wherein the frame further comprises a pair of slotted cross pieces horizontally spaced apart, perpendicular to the first and second side supports of the cover, and positioned proximate opposite ends of the trolley, whereby the slots of the pair of cross pieces are adapted to receive a plurality of rollers, whereby when a first trolley is stacked on a second trolley, the pair of slotted cross pieces of the second truss and trolley assembly receives the rollers of the first trolley, preventing the rollers from any rolling or swiveling movement.

3. The trolley of claim 1, wherein each rail of the one or more pairs of rails comprise a rail stopper, whereby when one of said one or more components are loaded onto the trolley by sliding said component along one of said one or more pairs of rails, said component is prevented by the rail stopper from further advancement along said pair of rails.

4. The trolley of claim 1, wherein vertical movement of said one or more components is constrained by providing a plurality of first cover bushings.

5. The trolley of claim 1, wherein horizontal movement of said one or more components is constrained by providing a plurality of second cover bushings.

6. The trolley of claim 5, wherein at least one of the plurality of second cover bushings are rectangular prisms.

7. The trolley of claim 5, wherein at least one of the plurality of second cover bushings are cylindrical.

8. The trolley of claim 1, wherein the trolley is further provided with a lock assembly for releasably securing the cover to the frame.

9. The trolley of claim 8, wherein the lock assembly comprises one or more pins mounted to the cover, wherein each of the one or more pins have a corresponding aperture on the frame for receiving the one or more pins.

10. The trolley of claim 1, wherein the trolley further comprising a plurality of horizontal supports mounted in between adjacent vertical supports, the horizontal supports being vertically spaced from the base of the trolley.

11. The trolley of claim 1, wherein two of the vertical supports of the frame each comprise a coupler, and wherein a bottom of the second side support comprises couplers for detachably receiving the pair of couplers of the vertical supports of the frame.

* * * * *